United States Patent Office 3,122,583
Patented Feb. 25, 1964

3,122,583
PREPARATION OF DIAMINOPIMELIC ACID
Ethan C. Galloway, Midland, Mich., assignor to The Dow Chemical Company, Midland, Mich., a corporation of Delaware
No Drawing. Filed May 26, 1959, Ser. No. 815,787
4 Claims. (Cl. 260—531)

This invention relates to a process for the synthesis of aminopimelic acid compounds which are characterized by the presence of amino groups in the linear pimelic acid.

Compounds such as 2,6-diaminopimelic acid are normally relatively difficult to synthesize by conventional routes, because the spacing of the groups on intermediate compounds occurring in the synthesis is favorable to ring closure to form the piperidine system. For example, if it is desired to form the diaminopimelic acid from 2,6-dibromopimelic acid by treatment thereof with ammonia, ring closure results and gives a piperidine derivative rather than the linear compound which is the pimelic acid having the spaced amino groups in its structure.

Certain pimelic acid compounds having amino groups spaced in the structure by 3 or 4 carbon atoms are particularly advantageous because of their usefulness in the synthesis of such amino acids as laevo-lysine.

It is, accordingly, a fundamental object of the invention to provide a direct route with relatively simple manipulations for the synthesis of such compounds as diaminopimelic acids wherein the amino groups are spaced from each other by about three or four carbon atoms.

Other objects and advantages of the invention will in part be obvious and in part appear hereinafter.

In accordance with this invention, therefore, pimelic acid having spaced amino groups therein is synthesized by reacting a compound having appropriately spaced functional groups to form a nitrile, or reacting a preformed nitrile, having the nitrile groups appropriately spaced, with ammonium carbonate, or similar reactant, to form an alkylene hydantoin compound and, thereafter, hydrolyzing said hydantoin compound to bring about a fission of the hydantoin rings to form the linear diaminopimelic acid compound sought. Basic to the process is the reaction of the fundamental starting material with ammonium carbonate rather than with a free amine substitution product, because by so doing ring formation between the two points of substitution on the starting material is avoided and, accordingly, the end linear compound can be derived.

More specifically, with the use of the ammonium carbonate as the basic reaction product, the reaction follows the following course:

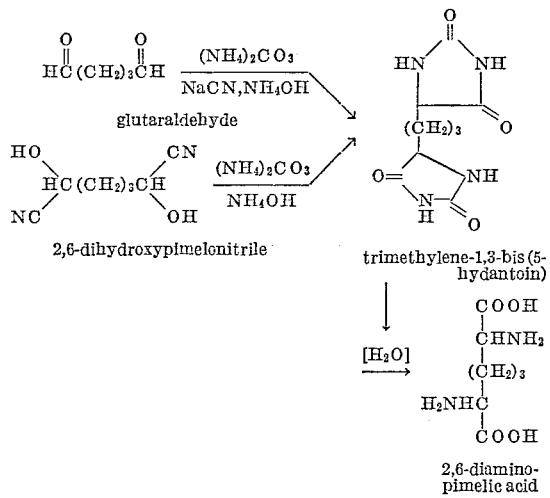

The details of the process may be better understood by reference to the following specific examples of the synthesis which may be considered to be typical of the manipulation of materials and temperatures to obtain the products involved.

Example I

Sodium bisulfite (55 grams of 95 percent, 0.53 mole) was slurried with 50 milliliters of water in a 500 milliliter 3-necked flask equipped with mechanical stirrer, dropping funnel, and ice bath. To the cold slurry, 100 grams (0.25 mole) of a 25 percent aqueous solution of glutaraldehyde was added slowly keeping temperature below 25° C. A solution of 26 grams (0.51 mole) of 98.5 percent sodium cyanide in 150 milliliters of water was then added in one portion. After stirring at 25° C. for 10 minutes the system was extracted with four 100 milliliter portions of ether. After drying over anhydrous magnesium sulfate in the cold for three days, the extracts were concentrated in vacuo to a 90 percent yield of 2,6-dihydroxypimelonitrile of 97 percent purity.

Ammonium carbonate (60 grams, 0.526 mole), 2,6-dihydroxypimelonitrile (15.4 grams of 90 percent purity, 0.09 mole) and 100 milliliters of 14 N ammonium hydroxide were combined in a stainless steel bomb and heated for 6 hours at 85° C. The bomb contents were treated with decolorizing charcoal and concentrated to an amorphous solid which contained a hydantoin derivative as its principal component. This crude substance was refluxed 22 hours with 100 milliliters of 48 percent HBr, water was added and the mixture was concentrated to dryness under reduced pressure. The residue was dissolved in 100 milliliters of water, decolorized with charcoal, and poured onto a column containing 1.0 mole of acid-form Dowex-50 exchange resin. After washing with water, 1 liter of dilute ammonium hydroxide was used to elute crude 2,6-diaminopimelic acid. Concentration of the eluate gave 16 grams of material. Recrystallization from equal amounts of water and ethyl alcohol gave 6.5 grams of 2,6-diaminopimelic acid of better than 95 percent purity; the yield was 37 percent. A second crop of 3.2 grams was isolated from the mother liquors. In some runs piperidine-2,6-carboxylic acid was isolated from acid hydrolysate.

Example II

Ammonium carbonate (338 grams, 2.15 moles), sodium cyanide (51.4 grams, 1.05 moles), and 200 milliliters of 14 N ammonium hydroxide were combined in a 2-liter 3-necked creased flask equipped with mechanical stirrer, thermometer, refluxed condenser, and dropping funnel. To the resulting white slurry, cooled in ice, 200 grams of a 25 percent aqueous glutaraldehyde solution (0.5 mole) was added slowly. After complete addition, the reaction mixture was heated at 73° C. for 21 hours and then concentrated in vacuo to an orange sirup. Note: 5-substituted hydantoins may be hygroscopic (J. Am. Chem. Soc., 69, 2009 (1947)).

Half of this sirup was hydrolyzed with 48 percent HBr in a manner similar to that described above to give a 30 percent yield of 2,6-diaminopimelic acid plus a 43 percent yield of material tentatively identified (by several analytical methods) as a mixture of diastereoisomers of 2,6-diaminopimelic acid. The remaining sirup was combined in a stainless steel bomb with 150 milliliters of water and 60 grams (1.5 moles) of 100 percent sodium hydroxide and heated at 175–185° C. for 3 hours.

The bomb liquor was adjusted to a pH of 9 with Dowex-50-H+ while warming over steam. After removing the resin by filtration the filtrate was acidified to a pH of 2 with 12 N HCl. After evolution of carbon dioxide ceased the solution was poured over 2.5 moles of Dowex-50-H+ and washed free of halide. Dilute ammonium hydroxide (about 1 liter) was used to remove product from the column. The eluate was concentrated to a yellow solid and this upon recrystallization from ethyl alcohol and water gave 5.5 grams or a 23 percent yield of 2,6-diaminopimelic acid. From the mother liquors a second crop of 3.3 grams was obtained.

Reference to the examples, which may be considered typical syntheses, will identify certain variables and indicate operable ranges. For example, the solvent used in the process may be water, aqueous ammonia or an alcohol such as methyl, ethyl or propyl alcohol. An advantage of the alcohol solvent is that the ammonium carbonate has a limited solubility therein. Similarly, where the starting material is an aldehyde, any alkali metal cyanide may be used in the process. The final cyanohydrin derivative of the aldehyde is easily converted to the corresponding hydantoin, which is then hydrolized by reaction with any strong inorganic acid such as hydrochloric acid or sulfuric acid or any strong alkali metal hydroxide such as sodium or potassium hydroxide. Since the purpose of the ammonium carbonate reactant is to provide a blocked amino group in the reaction product to avoid the undesired side reaction indicated, it is apparent that the compound such as ethyl carbamate or the gaseous reactants, ammonia mixed with carbon dioxide may be substituted for the ammonium carbonate in these first stages of the reaction.

In the preparation of the 2,6-dihydroxypimelonitrile, it is necessary to take care to avoid a high temperature so that hydrolysis of the compound to the amide form is avoided. Similarly, the addition of the aldehyde to the bisulfite solution calls for a deliberate operation since the glutaraldehyde approaches polymerization conditions in this reaction.

The 2,6-dihydroxypimelonitrile and ammonium carbonate reaction may be carried out in ammonium hydroxide solvent as described in Example I, aqueous solution, or aqueous methanol solution, or without any solvent at all (Org. Syn., vol. XX, 43, 5,5-dimethylhydantoin). A bomb is not necessary for this reaction although at temperatures above 60° C. ammonium carbonate volatilizes, and so must be replenished in the reaction system from time to time. Also, at the lower temperature the reaction is much slower. Excessive color develops at temperatures much above 85–90° C.

In the process described in Example II, addition of glutaraldehyde to the ammonium carbonate-sodium cyanide-ammonium hydroxide system should be performed slowly to prevent polymerization of the aldehyde. The temperature of the reaction is limited by the volatility of the ammonium hydroxide solvent at atmospheric pressure. Reaction at low temperatures is too slow to be practical.

From the foregoing description of the process, it will be apparent that a direct efficient synthesis of the useful material, 2,6-diaminopimelic acid can be carried out under reaction conditions suitable for the preparation of the compound on a large scale in suitable yields.

What is claimed is:

1. A process for preparing linear diamino acids having seven carbon atoms in the linear chain which comprises reacting an alkylene dialdehyde with an alkali cyanide and ammonium carbonate, to form an alkylene bishydantoin compound and, thereafter, hydrolyzing said hydantoin compound to the corresponding diaminoalkylenedicarboxylic acid.

2. A process in accordance with claim 1 in which glutaraldehyde is reacted with alkali metal cyanide and ammonium carbonate to produce 2,6-diamino-pimelic acid.

3. A process for preparing linear diamino acids having seven carbon atoms in the linear chain which comprises reacting a bis(hydroxynitrile) with ammonium carbonate to form an alkylene bishydantoin compound and thereafter hydrolyzing said hydantoin compound to the corresponding diaminodicarboxylic acid.

4. A process in accordance with claim 3 in which the nitrile is 2,6-dihydroxypimelonitrile.

References Cited in the file of this patent

UNITED STATES PATENTS

| | | |
|---|---|---|
| 2,557,920 | White | June 9, 1951 |
| 2,603,651 | Gaudry | July 15, 1952 |
| 2,626,263 | Gaudry | Jan. 20, 1953 |
| 2,663,713 | White et al. | Dec. 22, 1953 |
| 2,870,201 | Pollack | Jan. 20, 1959 |